(12) United States Patent
Herring

(10) Patent No.: US 10,701,915 B2
(45) Date of Patent: Jul. 7, 2020

(54) FISHING LURES WITH INTERCHANGEABLE SCENTS AND METHODS FOR EMBEDDING SCENTS IN FISHING LURES

(71) Applicant: Paul M. Herring, Mt. Pleasant, SC (US)

(72) Inventor: Paul M. Herring, Mt. Pleasant, SC (US)

( * ) Notice: Subject to any disclaimer, the term of this patent is extended or adjusted under 35 U.S.C. 154(b) by 228 days.

(21) Appl. No.: 15/836,142

(22) Filed: Dec. 8, 2017

(65) Prior Publication Data

US 2018/0160664 A1   Jun. 14, 2018

Related U.S. Application Data

(60) Provisional application No. 62/433,428, filed on Dec. 13, 2016.

(51) Int. Cl.
| | |
|---|---|
| *A01K 85/01* | (2006.01) |
| *B05D 7/24* | (2006.01) |
| *A01K 97/04* | (2006.01) |
| *B05D 1/00* | (2006.01) |
| *A01K 83/00* | (2006.01) |
| *B05D 1/18* | (2006.01) |

(52) U.S. Cl.
CPC ............. *A01K 85/01* (2013.01); *A01K 97/04* (2013.01); *B05D 7/24* (2013.01); *A01K 83/00* (2013.01); *B05D 1/18* (2013.01); *B05D 1/60* (2013.01); *B05D 2258/00* (2013.01)

(58) Field of Classification Search
CPC ..................................................... A01K 85/01
USPC ......................................................... 43/42.06
See application file for complete search history.

(56) References Cited

U.S. PATENT DOCUMENTS

| | | | | |
|---|---|---|---|---|
| 1,816,725 A | * | 7/1931 | Freeman ................ | A01K 85/01 |
| | | | | 43/41 |
| 2,797,517 A | * | 7/1957 | Eriksen ................. | A01K 85/16 |
| | | | | 43/42.06 |

(Continued)

FOREIGN PATENT DOCUMENTS

| | | | | |
|---|---|---|---|---|
| CA | 2424984 A1 | * 10/2003 | ............ | A01K 85/00 |
| CA | 2417420 A1 | * 7/2004 | ............ | A01K 85/01 |

(Continued)

OTHER PUBLICATIONS

International Preliminary Report on Patentability dated Jun. 18, 2019 in corresponding PCT Application No. PCT/US2017/065358; (9 Pages).

(Continued)

*Primary Examiner* — Christopher P Ellis
(74) *Attorney, Agent, or Firm* — K&L Gates LLP

(57) ABSTRACT

The present disclosure is directed to fishing lures with interchangeable scents and methods of embedding scents in fishing lures. In an embodiment, a fishing lure configured to be customized with different scents includes a body, and a plurality of attachments configured to be attached to and detached from the body, wherein a first attachment of the plurality of attachments includes a first scent, and a second attachment of the plurality of attachments includes a second scent, and wherein the first attachment and the second attachment can be interchangeably attached to and detached from the body at a same location of the body.

10 Claims, 12 Drawing Sheets

(56) References Cited

U.S. PATENT DOCUMENTS

| | | | |
|---|---|---|---|
| 3,434,230 A * | 3/1969 | Littlefield | A01K 85/01 43/42.06 |
| 3,605,316 A * | 9/1971 | Rogers | A01K 97/045 43/42.06 |
| 4,047,317 A | 9/1977 | Pfister | |
| 4,610,103 A * | 9/1986 | Steinman | A01K 85/01 43/17.6 |
| 4,712,325 A | 12/1987 | Smith | |
| 4,726,138 A | 2/1988 | Hurt | |
| 4,742,638 A | 5/1988 | Vobejda | |
| 4,744,167 A | 5/1988 | Steele | |
| 4,777,757 A | 10/1988 | De Marees Van Swinderen | |
| 4,823,497 A | 4/1989 | Pierce | |
| 4,875,305 A | 10/1989 | Bridges | |
| 4,962,609 A | 10/1990 | Walker | |
| 4,964,325 A | 10/1990 | Hartmann, Jr. et al. | |
| 5,070,639 A * | 12/1991 | Pippert | A01K 85/00 43/42.09 |
| 5,097,616 A | 3/1992 | Johnston, Jr. | |
| 5,155,947 A * | 10/1992 | Rivard | A01K 85/01 43/42.06 |
| 5,170,579 A | 12/1992 | Hollinger | |
| 5,170,582 A | 12/1992 | Morgin et al. | |
| 5,172,510 A | 12/1992 | Lovell, Jr. | |
| 5,265,368 A * | 11/1993 | Taylor | A01K 85/00 43/42.06 |
| 5,471,780 A * | 12/1995 | Hopson | A01K 85/01 43/42.06 |
| 5,537,770 A | 7/1996 | Storm et al. | |
| 5,678,349 A | 10/1997 | Pacora | |
| 5,858,494 A | 1/1999 | Cherkas et al. | |
| 5,915,944 A | 6/1999 | Strunk | |
| 5,926,993 A | 7/1999 | Marusak et al. | |
| 6,032,401 A | 3/2000 | King et al. | |
| 6,041,538 A | 3/2000 | Roemer | |
| 6,041,540 A | 3/2000 | Potts | |
| 6,061,947 A * | 5/2000 | Mooers | A01K 85/01 43/42.06 |
| 6,079,145 A * | 6/2000 | Barringer | A01K 85/01 43/42.06 |
| 6,079,146 A | 6/2000 | Larsen et al. | |
| 6,115,956 A | 9/2000 | Firmin | |
| 6,141,900 A | 11/2000 | Rudolph | |
| 6,161,324 A | 12/2000 | Hugunin | |
| 6,164,006 A | 12/2000 | Peterson | |
| 6,176,035 B1 | 1/2001 | Somogyi | |
| 6,192,617 B1 * | 2/2001 | Lyles | A01K 85/01 43/17.1 |
| 6,266,916 B1 | 7/2001 | Dugan | |
| 6,393,756 B1 | 5/2002 | Forney et al. | |
| 6,530,488 B1 | 3/2003 | Krammes, Jr. | |
| 6,557,293 B2 | 5/2003 | Klapka | |
| 6,668,482 B1 * | 12/2003 | Ruffin | A01K 85/01 43/42.06 |
| 6,779,293 B1 * | 8/2004 | Rice | A01K 85/01 43/42.06 |
| 7,114,280 B2 | 10/2006 | Turner | |
| 7,131,233 B1 * | 11/2006 | Preston | A01K 85/01 43/42.06 |
| 7,152,361 B2 | 12/2006 | Berdine | |
| 7,174,669 B1 | 2/2007 | Kallas | |
| 7,228,656 B2 | 6/2007 | Mitchell et al. | |
| 7,562,489 B2 | 7/2009 | Turner | |
| 7,607,253 B2 | 10/2009 | Makowski | |
| 8,230,639 B2 | 7/2012 | Langer et al. | |
| 8,484,884 B2 | 7/2013 | Zuk | |
| 8,490,319 B2 | 7/2013 | Briccetti et al. | |
| 8,745,916 B1 | 6/2014 | Rutty | |
| 8,813,418 B2 | 8/2014 | Sundstrom | |
| 8,925,242 B1 | 1/2015 | Thomson | |
| 9,095,128 B2 | 8/2015 | Mancini et al. | |
| 9,770,015 B2 | 9/2017 | Slocum | |
| 9,936,681 B2 | 4/2018 | Mancini et al. | |
| 10,258,024 B2 | 4/2019 | Mancini et al. | |
| 10,264,770 B1 | 4/2019 | Morales | |
| 2002/0029509 A1 | 3/2002 | Hugunin | |
| 2003/0046856 A1 | 3/2003 | Klapka | |
| 2003/0046857 A1 | 3/2003 | Paulsen et al. | |
| 2003/0126785 A1 * | 7/2003 | Poinski | A01K 85/01 43/42.06 |
| 2003/0192227 A1 | 10/2003 | Stava et al. | |
| 2004/0216356 A1 | 11/2004 | Matchinga | |
| 2005/0028424 A1 | 2/2005 | Poinski | |
| 2005/0229475 A1 | 10/2005 | Dobbs et al. | |
| 2005/0246941 A1 | 11/2005 | Mitchell | |
| 2006/0005457 A1 * | 1/2006 | Harris | A01K 85/01 43/42.06 |
| 2006/0016118 A1 | 1/2006 | Zuk | |
| 2006/0042149 A1 | 3/2006 | Berdine | |
| 2006/0075676 A1 | 4/2006 | Turner | |
| 2006/0143971 A1 | 7/2006 | Mitchell et al. | |
| 2006/0218848 A1 * | 10/2006 | Melhorn | A01K 91/06 43/44.99 |
| 2007/0039228 A1 | 2/2007 | Makowski | |
| 2007/0186461 A1 | 8/2007 | Sarnacki | |
| 2007/0199231 A1 | 8/2007 | Mitchell | |
| 2008/0000140 A1 | 1/2008 | Mitchell et al. | |
| 2008/0092429 A1 | 4/2008 | Turner | |
| 2008/0263933 A1 * | 10/2008 | Gibson | A01K 85/00 43/42.06 |
| 2008/0276521 A1 * | 11/2008 | Turpin | A01K 85/00 43/42.06 |
| 2009/0019761 A1 * | 1/2009 | Thomsen | A01K 85/01 43/42.06 |
| 2009/0223109 A1 | 9/2009 | Makowski | |
| 2010/0154285 A1 | 6/2010 | Greenfield | |
| 2010/0218413 A1 * | 9/2010 | Simmons | A01K 85/00 43/42.09 |
| 2011/0010983 A1 * | 1/2011 | Briccetti | A01K 85/00 43/17.6 |
| 2011/0197493 A1 | 8/2011 | Kwong et al. | |
| 2011/0214332 A1 | 9/2011 | Partridge | |
| 2011/0239520 A1 * | 10/2011 | Ostrom | A01K 85/01 43/42.06 |
| 2011/0296736 A1 | 12/2011 | Sundstrom | |
| 2012/0055316 A1 | 3/2012 | Smith et al. | |
| 2012/0096757 A1 | 4/2012 | Langer et al. | |
| 2012/0102816 A1 * | 5/2012 | Newman | A01K 85/01 43/42.06 |
| 2013/0269235 A1 | 10/2013 | Mancini et al. | |
| 2014/0311010 A1 * | 10/2014 | Talbot | A01K 85/01 43/42.06 |
| 2015/0150226 A1 | 6/2015 | McLeod | |
| 2015/0373957 A1 | 12/2015 | Smith, Sr. | |
| 2016/0057982 A1 | 3/2016 | Slocum | |
| 2017/0000096 A1 | 1/2017 | Mancini | |
| 2017/0105400 A1 | 4/2017 | Gillihan | |
| 2017/0295764 A1 | 10/2017 | Pillard, Jr. | |
| 2017/0325437 A9 | 11/2017 | Mancini et al. | |
| 2018/0139942 A1 * | 5/2018 | Varian | A01K 85/01 |
| 2018/0160668 A1 | 6/2018 | Herring | |
| 2018/0206467 A1 | 7/2018 | Mancini et al. | |
| 2018/0317468 A1 | 11/2018 | Rauch | |

FOREIGN PATENT DOCUMENTS

| | | | | |
|---|---|---|---|---|
| GB | 2415348 A | * | 12/2005 | A01K 85/01 |
| WO | WO-9730584 A1 | * | 8/1997 | A01K 85/01 |
| WO | WO-2009149488 A1 | * | 12/2009 | A01K 85/00 |

OTHER PUBLICATIONS

International Search Report dated Mar. 29, 2018 in corresponding PCT Application No. PCT/US2017/065358; (4 Pages).

Written Opinion of the International Searching Authority dated Mar. 29, 2018 in corresponding PCT Application No. PCT/US2017/065358; (8 Pages).

* cited by examiner

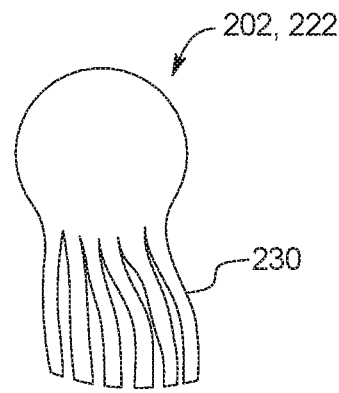
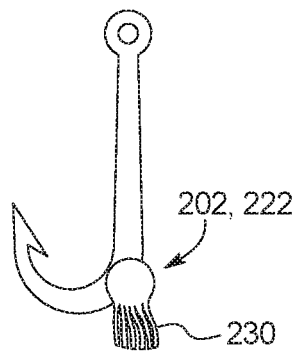
FIG. 8A  FIG. 8B
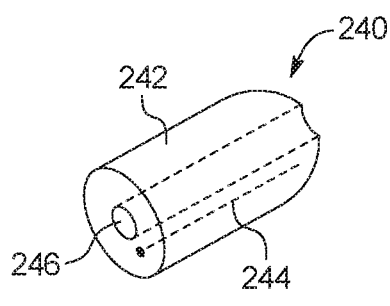
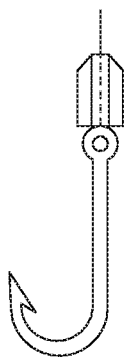
FIG. 9A  FIG. 9B
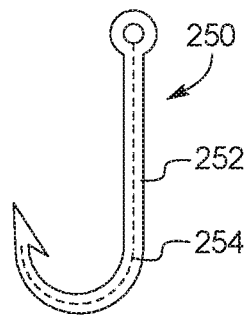
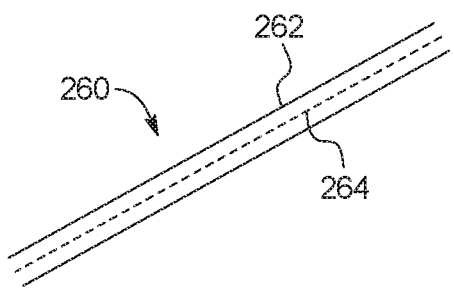
FIG. 10  FIG. 11

FISHING LURES WITH INTERCHANGEABLE SCENTS AND METHODS FOR EMBEDDING SCENTS IN FISHING LURES

PRIORITY

This application claims priority to U.S. Provisional Application No. 62/433,428, filed Dec. 13, 2016, entitled "Apparatuses and Methods for Embedding a Scent in a Fishing Lure", and is related to U.S. patent application Ser. No. 15/621,633, filed Jun. 13, 2017, entitled "Apparatuses and Methods for Embedding a Scent in a Fishing Lure", the entire contents of each of which are incorporated herein by reference and relied upon.

FIELD OF THE DISCLOSURE

The present disclosure relates generally to scented fishing lures, and more specifically to fishing lures with interchangeable attachments embedded with different scents.

BACKGROUND OF THE DISCLOSURE

Fish are attracted to scents. For this reason, many fishermen either purchase scented baits or apply scents to fishing lures to increase their chances of catching fish. When a scent is applied to a fishing lure, it is typically applied by coating the fishing lure with a liquid and allowing the liquid to dry. For example, a scented liquid can be sprayed onto a fishing lure, or the fishing lure can be dipped into the scented liquid. These methods, however, do not always ensure that the scent will remain with the fishing lure for an extended period of time, meaning that the scents must be constantly reapplied. These methods thus cause the fisherman to constantly handle the fishing lure, enabling oils from the fisherman's own hands to transfer to the fishing lure or the scents to transfer from the fishing lure to the fisherman. Many scented liquids that are used to coat fishing lures are also messy to handle.

SUMMARY OF THE DISCLOSURE

The present disclosure is directed to methods and apparatuses for embedding scents in fishing lures. In a general example embodiment, a fishing lure configured to be customized with different scents includes a body, and a plurality of attachments configured to be attached to and detached from the body, wherein a first attachment of the plurality of attachments includes a first scent, and a second attachment of the plurality of attachments includes a second scent, and wherein the first attachment and the second attachment can be interchangeably attached to and detached from the body at a same location of the body.

In another embodiment, the body includes a hook.

In another embodiment, the body is configured to be attached to a hook.

In another embodiment, the body includes a slot configured to interchangeably receive the first and second attachments.

In another embodiment, the first attachment and the second attachment are disc-shaped and interchangeably fit into the slot.

In another embodiment, the first attachment and the second attachment each include an electrically conductive material.

In another embodiment, the body includes vents to disperse the first scent when the first attachment is attached to the body and the second scent when the second attachment is attached to the body.

In a general example embodiment, a device for supplementing a fishing hook or other fishing device to attract or repel fish includes an accessory holder, and a plurality of accessories attached to the accessory holder, each of the plurality of accessories including a body formed of a material capable of absorbing an applied scent, wherein the plurality of accessories are each individually attached to the accessory holder and are configured to individually detach from the accessory holder and attach to the fishing hook or other fishing device so that the applied scent can by used to attract or repel fish.

In another embodiment, one or more of the plurality of accessories includes a conductive material, the conductive material configured to attract the applied scent to the body when an electrical charge is applied thereto.

In another embodiment, the accessory holder is configured to place the conductive material in electrical communication with an outside source for applying the electrical charge to the conductive material.

In another embodiment, the accessory holder includes a conductive material configured to attract the applied scent to the bodies when an electrical charge is applied to the conductive material.

In another embodiment, one or more of the plurality of accessories includes an adhesive, and the adhesive attaches the one or more of the plurality of accessories to the accessory holder.

In another embodiment, one or more of the plurality of accessories includes an adhesive, and the adhesive attaches the one or more of the plurality of accessories to the fishing hook or other fishing device.

In another embodiment, the plurality of accessories are configured to interchangeably be placed into a slot of a fishing lure to alternate a scent dispersed by the fishing lure.

In another embodiment, one or more of the plurality of accessories includes a plurality of strips for visually attracting fish.

In a general example embodiment, a method of using a plurality of scents to attract or repel fish includes impregnating a plurality of first accessories located on a first accessory holder with a first scent, impregnating a plurality of second accessories located on a second accessory holder with a second scent, the second scent different from the first scent, attaching one or more of the plurality of first accessories to a fishing hook or other fishing device to attract or repel fish with the first scent, removing the one or more of the plurality of first accessories from the fishing hook or other fishing device, and attaching one or more of the plurality of second accessories to the fishing hook or other fishing device to attract or repel fish with the second scent.

In another embodiment, attaching the one or more of the plurality of first accessories includes adhering the one or more first accessories, and attaching the one or more of the plurality of second accessories includes adhering the one or more second accessories.

In another embodiment, attaching the one or more of the plurality of first accessories includes placing one of the first accessories into a slot of the fishing hook or other fishing device, and attaching the one or more of the plurality of second accessories includes placing one of the second accessories into the slot of the fishing hook or other fishing device.

In another embodiment, impregnating the plurality of first accessories includes applying an electrical charge to the first accessory holder, and impregnating the plurality of second accessories includes applying an electrical charge to the second accessory holder.

In another embodiment, one or more of the plurality of first accessories and the plurality of second accessories includes a conductive material to assist in impregnating with the first scent or the second scent.

BRIEF DESCRIPTION OF THE DRAWINGS

Embodiments of the present disclosure will now be explained in further detail by way of example only with reference to the accompanying figures, in which:

FIG. 8A is a front plan view of another example embodiment of an individual fishing accessory according to the present disclosure;

FIG. 8B is a front plan view of the fishing accessory of FIG. 8A attached to a fishing hook;

FIG. 9A is a front perspective view of another example embodiment of an individual fishing accessory according to the present disclosure;

FIG. 9B is a front plan view of the fishing accessory of FIG. 9A attached to a fishing hook;

FIG. 10 is a front plan view of an example embodiment of a fishing hook according to the present disclosure;

FIG. 11 is a front perspective view of an example embodiment of a fishing line according to the present disclosure;

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

The present disclosure relates to methods and apparatuses for embedding a scent in a fishing lure. As understood by those of ordinary skill in the art, a fishing lure is typically placed at the end of a fishing line and includes or is attached to a hook designed to attach to a fish when the fishing lure is bitten by the fish. Though the present disclosure is directed to fishing lures, those of ordinary skill in the art may recognize other applications of the methods and apparatuses discussed herein. For example, in an embodiment, the methods and apparatuses of the present disclosure can be used to embed a scent into a piece of clothing worn by a swimmer.

Figure 1:
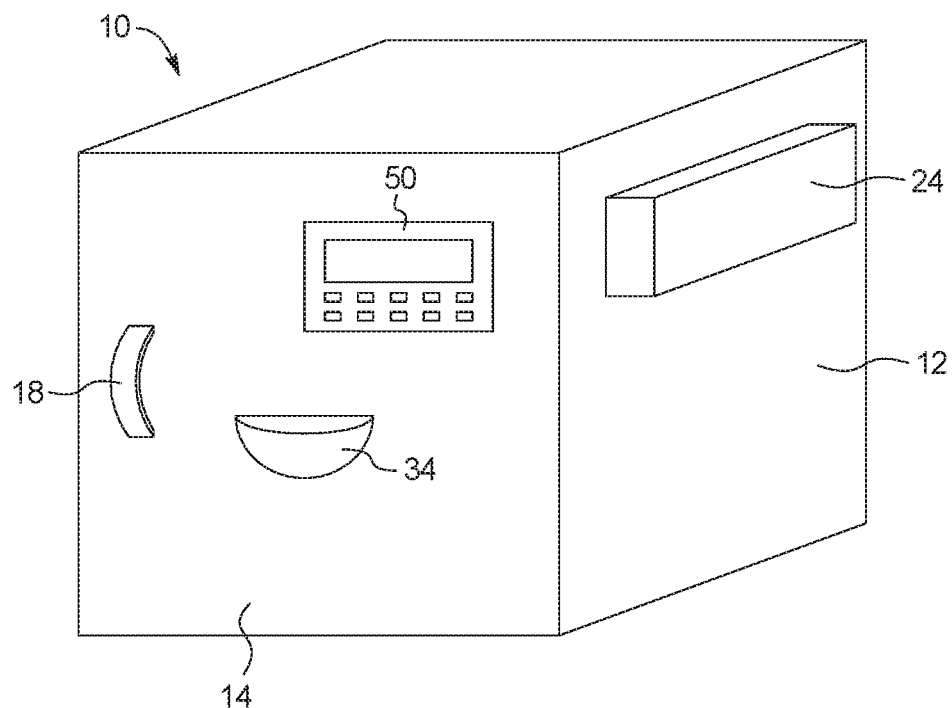
FIG. 1 is a perspective view of an example embodiment of a scent application device in accordance with the present disclosure in a closed configuration.
Figure 2:
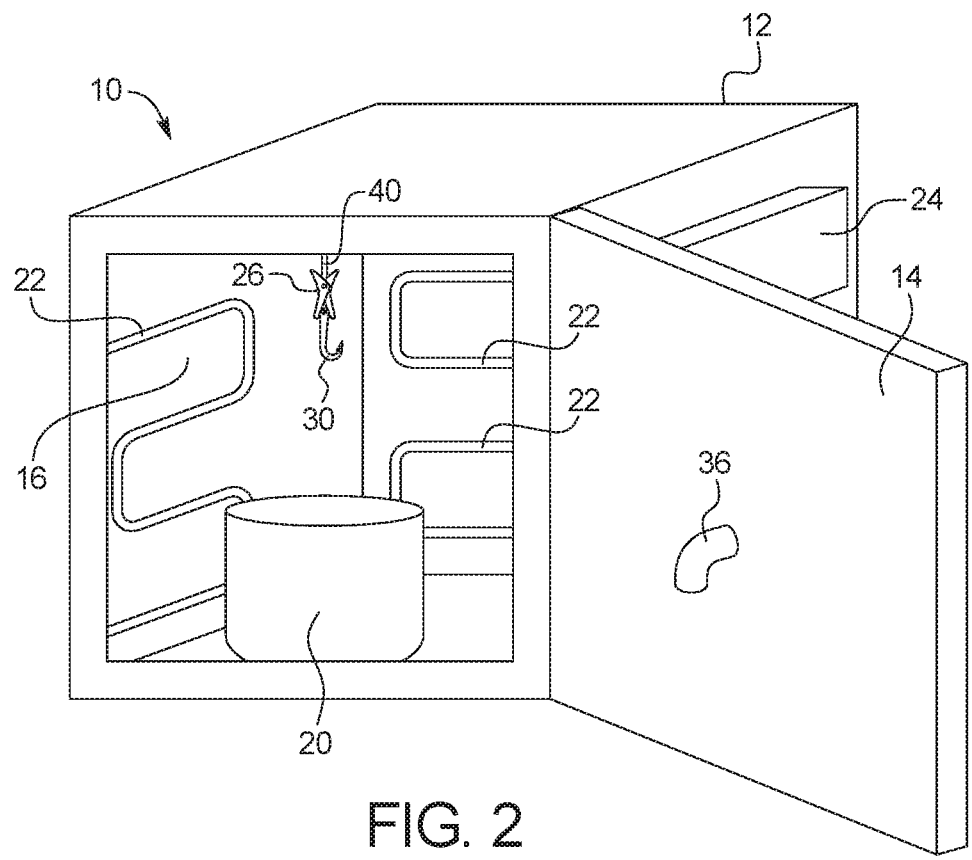
FIG. 2 is a perspective view of the scent application device of FIG. 1 in an open configuration.
Figure 3:
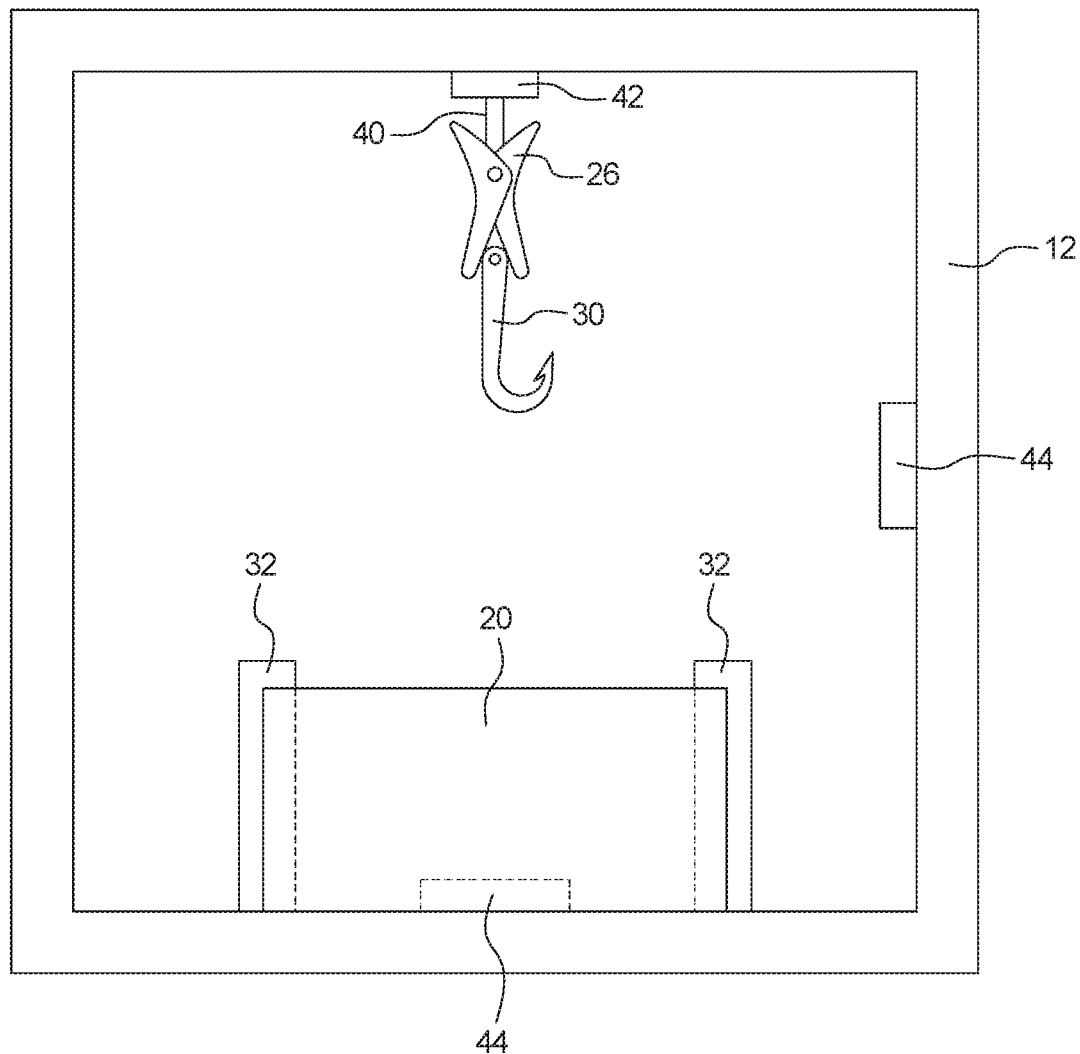
FIG. 3 is a front plan view of the scent application device of FIG. 1 in an open configuration.

FIGS. 1 to 3 illustrate an example embodiment of a scent application device 10 according to the present disclosure. In the illustrated embodiment, device 10 includes a body 12 and a door 14 with a handle 18. When door 14 is closed as illustrated in FIG. 1, an inner space 16 of body 12 is sealed off from the environment outside of body 12. Sealing of the inner space 16 by door 14 creates an isolated environment for a scent to be applied to a fishing lure 30.

FIGS. 2 and 3 show an example embodiment of a configuration inside of inner space 16 of body 12. In the illustrated embodiment, device 10 includes a liquid scent container 20, a heating mechanism 22, a pressurization mechanism 24, and a lure attachment mechanism 26.

Container 20 is a container for a scented liquid. The scented liquid can include, for example, commercially available oil or non-oil based scents extracted for example from shad, crayfish, baitfish, worms and/or other water-oriented creatures and/or liquid that has been infused with a bait scent. Those of ordinary skill in the art will recognize other scented liquids that can be used.

Container 20 can be filled with the scented liquid by opening door 14 and pouring the scented liquid into container 20, or by pouring the scented liquid into container 20 with door 14 already closed. In the illustrated embodiment, an outer surface of door 14 includes a liquid receiving dish 34 in fluid communication with a spout 36 on the inner surface of door 14. A user can therefore close door 14 and pour the scented liquid into liquid receiving dish 34, and the scented liquid will be guided through spout 36 and into container 20. In an embodiment, spout 36 can be sealed so that inner space 16 is isolated from the outside environment when the scented liquid is not being poured into container 20. In an embodiment, device 10 can include multiple containers 20, multiple receiving dishes 34 and/or multiple spouts 36, enabling multiple different scents to be embedded at the same time. Liquid receiving dish and spout 36 can be included on any surface of body 10.

Heating mechanism 22 is configured to raise or lower the temperature within inner space 16. Heating mechanism 22 can include, for example, heating coils located on or within the inner walls, lower surface and/or upper surface of body 12. In an embodiment, heating mechanism 22 can include a heating portion 32 of container 20 that directly contacts the scented liquid within container 20 to cause steam to be created from the scented liquid.

Pressurization mechanism 24 can be used to create a positive pressure or a negative pressure within inner space 16. In an embodiment, pressurization mechanism includes a vacuum pump that is configured to pump air into inner space 16 to increase the pressure within inner space 16 when inner space 16 is isolated from the outside environment and/or to pump air out of inner space 16 to decrease the pressure within inner space 16 when inner space 16 is isolated from the outside environment. In an embodiment, pressurization mechanism 24 can pressurize inner space 16 with a compressed or pressurized gas, for example, carbon dioxide.

Figure 4:
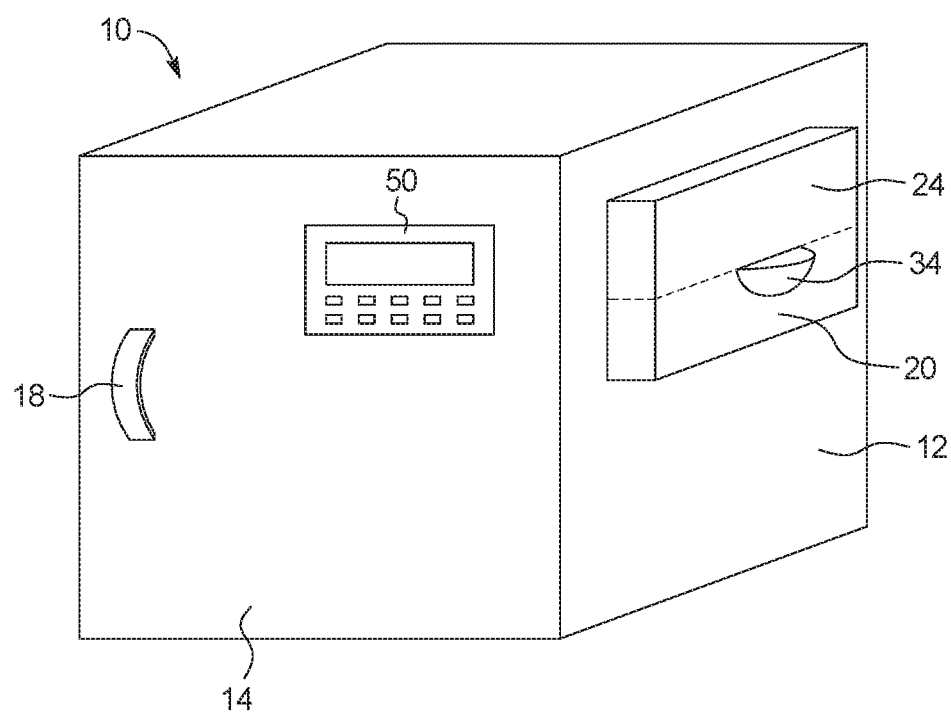
FIG. 4 is a perspective view of an example embodiment of a scent application device in accordance with the present disclosure in a closed configuration.

In the alternative embodiment illustrated in FIG. 4, container 20 is located outside of inner space 16 as part of pressurization mechanism 24. A heating mechanism 22 can cause scented liquid within container 20 to create steam, which steam can then be pumped into inner space 16 by pressurization mechanism 22 to create positive pressure within inner space 16.

A fishing lure 30 can be attached to attachment mechanism 26 and sealed inside of inner space 16 by closing door 14. In the illustrated embodiment, attachment mechanism 26 includes a clamp that can clamp onto a fishing lure to suspend the fishing lure within inner space 16. Those of ordinary skill in the art will recognize other attachment mechanisms that can be used besides a clamp, for example, a hook, a sling, or the like. In the illustrated embodiment, attachment mechanism 26 hangs from the top of body 12 to expose a maximum amount of surface area of fishing lure 30 for application of a scent. Those of ordinary skill in the art will also recognize that other configurations are possible.

In the illustrated embodiment, attachment mechanism 26 hangs from the upper surface of body 12 by a cord 40. In an embodiment, cord 40 may enable attachment mechanism 26 to be raised or lowered so that fishing lure 30 can be dipped into the liquid residing in container 20. In another embodiment, attachment mechanism 26 can be kept stationary or in a raised configuration so that fishing lure 30 hangs in the middle of inner space 16 to enable a scent to be added to fishing lure 30 via steam. In an embodiment, device 10 can include multiple attachment mechanisms so that multiple fishing lures 30 can have a scent applied at the same time.

In an embodiment, cord 40 and/or attachment mechanism 26 can be part of a conductive element formed of a conductive material. A metal such as copper, silver, gold, aluminum, zinc, nickel, brass, bronze, iron, platinum, steel or lead, or an alloy or mixture thereof, for example, can be included as part or all of cord 40 and/or attachment mechanism 26 to provide a conductive element. A fishing lure 30 can then be hung from attachment mechanism 26, and an electrical or magnetic charge can be applied to the fishing lure 30 via cord 40 and/or attachment mechanism 26, for example, to create a positive or negative charge within fishing lure 30, to cure a liquid scent applied to fishing lure 30, and/or to cause fishing lure 30 to attract an ionized scent.

In an embodiment, the scented liquid can contain a salt solution with the ability to separate into positive and negative ions. For example, the scented liquid can include sodium chloride or potassium chloride. Those of ordinary skill in the art will recognize other salt solutions that can be used with device 10.

To apply a charge to the fishing lure 30, cord 40 and/or attachment mechanism 26 can be conductively connected to an electrode 42 and/or can include electrode 42 as a part thereof. In an embodiment, the electrode 42 can be an anode or a cathode. In an embodiment, electrode 42 is one of an anode or a cathode, while another electrode 44 is the other of the anode and cathode and is located within container 20 or elsewhere inside of inner space 16. As explained in more detail below, when the anode and cathode are activated, positive ions can be attracted to the cathode and negative ions can be attracted to the anode. Thus, by applying a positive or negative charge to fishing lure 30 held by attachment mechanism 26, device 10 can cause positive or negative ions to be attracted to fishing lure 30, for example, to attract the scent to fishing lure 30 or cure a scent applied to the fishing lure 30.

In the embodiment in which fishing lure 30 is dipped into scented liquid in container 20, one of an anode and a cathode can be used to apply a positive or a negative charge to fishing lure 30, while the other of an anode and a cathode can be located within container 20. The anode and cathode can then be activated to cause positive or negative ions from the scented liquid to attach to fishing lure 30. The type of ions attracted to fishing lure 30 will depend on whether a positive or negative charge is applied to fishing lure 30.

In the embodiment in which fishing lure 30 hangs in the middle of inner space 16 to enable a scent to be added to fishing lure 30 via steam, one of an anode and a cathode can be used to apply a positive or a negative charge to fishing lure 30, while the other of an anode and a cathode can be located elsewhere inside of inner space 16. When the scented liquid is heated to create steam, the anode and cathode can be activated to cause positive or negative ions from the steam to attach to fishing lure 30.

In the illustrated embodiment, door 14 of device 10 includes a user interface 50 and control unit 52 to control the various elements of device 10. Control unit 52 can include a processor and a memory, which can include a non-transitory computer readable medium. In an embodiment, the memory can store optimized settings for adding a scent to a fishing lure. In an embodiment, a user can use user interface 50 to program device 10 to operate at different temperatures and/or pressures and/or can use user interface 50 to apply an electrical or magnetic charge to a fishing lure within inner space 16.

Figure 5:
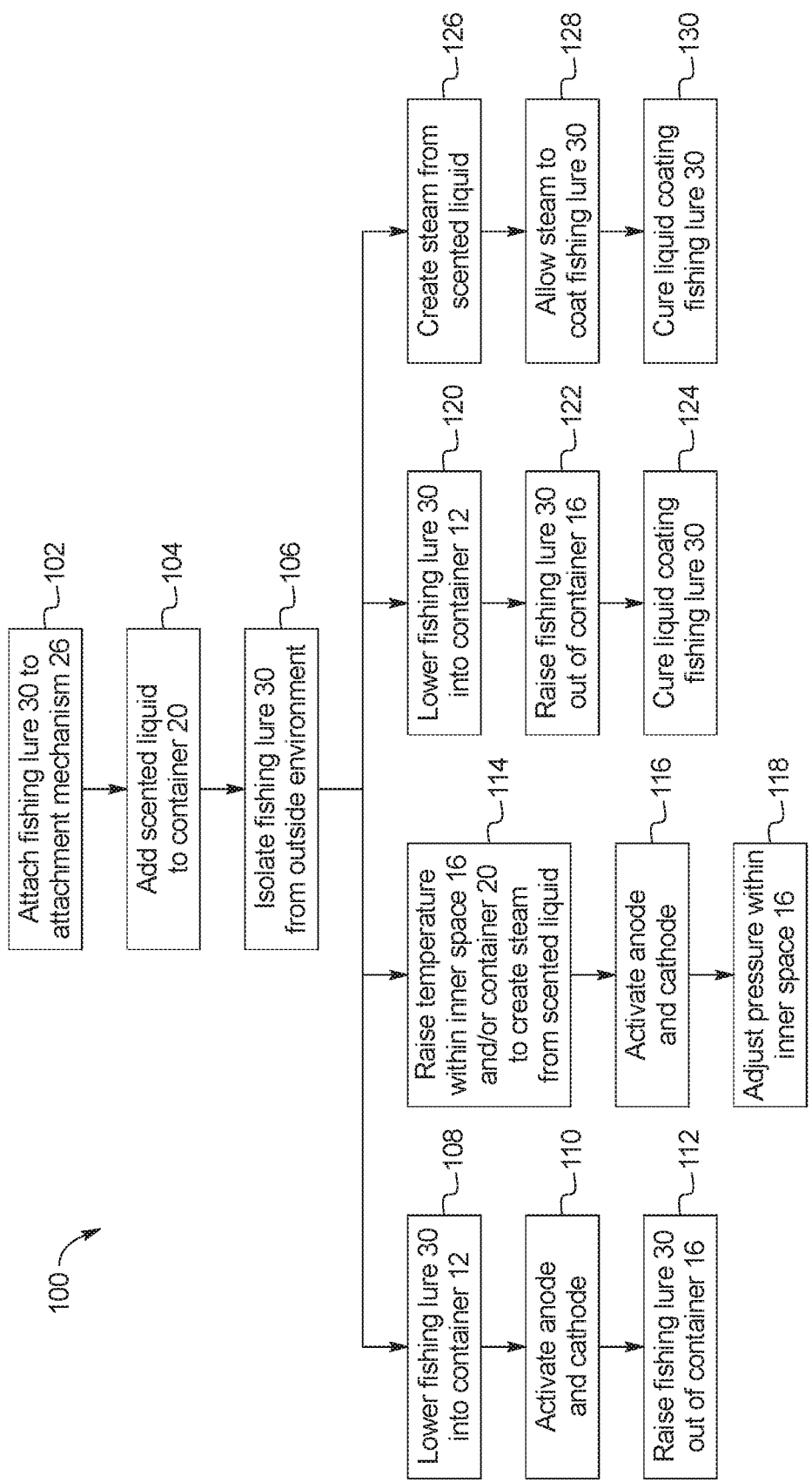
FIG. 5 is an example embodiment of a control method that can be performed using the scent application device of the present disclosure.

FIG. 5 shows a control method 100 for operating device 10 to add a scent to a fishing lure 30. Those of ordinary skill in the art will recognize that several of the steps can be performed in different orders and/or omitted from the method.

At step 102, a fishing lure 30 is attached to attachment mechanism 26. Attachment can be via a clamp or other attachment mechanism as described above, and can place fishing lure 30 in conductive communication with an electrode 42.

At step 104, a scented liquid is added to container 20. The scented liquid can be premixed or mixed within container 20. In an embodiment, water can be mixed with a powder or liquid concentrate within container 20 to create the scented liquid.

At step 106, inner space 16 of body 12 is sealed from the outside environment, isolating fishing lure 30 within inner space 16. Sealing inner space 16 from the outside environment allows the temperature and pressure within inner space 16 to be precisely controlled, and also prevents the scent from escaping device 10 when steam is created.

Depending on how the scent is to be applied to the fishing lure 30, method 100 can then proceed to any of steps 108, 114, 120 or 126. In an embodiment, one or more of steps 108, 114, 120 or 126 is enabled by device 10, and a user can modify how the scent is applied by selecting options using user interface 50.

If fishing lure 30 is to be dipped into scented liquid in container 20, and the scented liquid is to then be applied using an electrode 42 such as an anode or cathode, cord 40 can cause fishing lure 30 to be lowered at step 108. At step 110, the anode and cathode can be activated so that ions of the scented liquid separate, with the positive ions being attracted to the cathode and the negative ions being attracted to the anode. The fishing lure 30 can then be raised from the scented liquid at step 112 and retain the positive or negative ions attracted thereto by the anode or cathode. The temperature can also be increased by heating mechanism 22 to cure the liquid retained on fishing lure 30, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

If the scent is to be applied to fishing lure 30 via steam, then the method proceeds to step 114 so that the control unit 52 causes heating mechanism 22 to raise the temperature within inner space 16 and/or container 20 to create steam from the scented liquid. The steam can then be caused to attach a scent to the fishing lure 30 via the anode and cathode and/or via pressurization. To cause the steam to attach the scent to fishing lure 30 via the anode or cathode, control unit 52 activates the anode and cathode at step 116 so that ions of the scented steam separate, with the positive ions being attracted to the cathode and the negative ions being attracted to the anode. To cause the steam to attach the scent to fishing lure 30 via pressurization, control unit 52 activates pressurization mechanism 24 at step 118 to create a positive or negative pressure within inner space 16. The temperature can also be further increased by heating mechanism 22 to cure the liquid on fishing lure 30, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

If fishing lure 30 is to be dipped into scented liquid in container 20 without activating an anode or cathode, cord 40 can cause fishing lure 30 to be lowered at step 120. Fishing lure 30 can then be raised from the scented liquid at step 122 with a coating of scented liquid. The scented liquid coating fishing lure 30 can then be cured by raising the temperature with heating mechanism 22, by adjusting the pressure within inner space 16 using pressurization mechanism 24, by applying an electrical or magnetic charge to fishing lure 30 using electrode 42 or a magnet, and/or using another curing mechanism.

If the scent is to be applied to fishing lure 30 via steam without activating an electrode, then the method proceeds to step 126 so that the control unit 52 causes heating mechanism 22 to raise the temperature within inner space 16 and/or container 20 to create steam from the scented liquid. The steam can be created within inner space 16 or can be pumped into inner space 16 by pressurization mechanism 22 to simultaneously adjust the pressure within inner space 16. After a period of time allowing the steam to contact fishing lure 30 at step 128, the temperature can be increased further by heating mechanism 22 to cure the steam attracted to fishing lure 30 at step 130, the pressure within inner space can be adjusted by pressurization mechanism 24 to cure the liquid retained on fishing lure 30, an electrical or magnetic charge can be applied to fishing lure 30 via electrode 42 or a magnet to cure the liquid retained on fishing lure 30, and/or another curing mechanism can be used.

In an alternative embodiment, the liquid or steam contacting fishing lure 30 can be cured, for example, by UV lights positioned to direct ultraviolet ("UV") energy towards fishing lure 30 within inner space 16. In another embodiment, an electrical or magnetic charge applied to fishing lure 30 by electrode 42 can be used to cure the liquid or steam. Those of ordinary skill in the art will recognize other methods of curing liquid or steam contacting fishing lure 30

The steps above can be performed in a sequence, simultaneously, or in any combination. By performing two or more of steps simultaneously, the strength of the scent attached to fishing lure 30 can be increased. In an embodiment, a user can use user interface 50 to precisely control which steps occur and at what termperatures, pressures and voltages they occur at.

In an embodiment, device 10 can be operated without any scented liquid so as to apply a charge to a fishing lure without adding a scent so that the charged fishing lure can be used to attract fish. It is believed that certain types of fish may sense the charge of the fishing lure and therefore be more likely to bite the fishing lure. Many fish use the principle of electroreception to perceive electrical stimuli, so adding a charge to the fishing lure may make the fishing lure more attractive to or more easily recognized by certain types of fish, regardless of any additional scent retained by the fishing lure.

In an embodiment according to the present disclosure, fishing lure 30 can be formed with a battery operated device therein to create a pulsed signal.

In an embodiment, a waterborne device other than a fishing lure can be impregnated with a scent. For example, it may be advantageous for a swimmer to embed a wetsuit or other waterborne device worn or carried by the swimmer with a scent that would repel fish such as sharks from the swimmer. In an embodiment, the other waterborne device could be an armband, legband or surfboard attachment that can attach to a swimmer or surfboard to repel fish such as sharks. In an embodiment, the waterborne device can be a device that removably attaches to the swimmer, swimmer's clothing or surfboard, for example, by hook and loop material or another type of attachment.

In an embodiment, the wetsuit or other waterborne device can be attached to attachment mechanism 26 as described with respect to fishing lure 30 above. Device 10 can then be operated as described above to embed the scent in the wetsuit or other waterborne device using the method described above.

In an embodiment, the wetsuit or other waterborne device can include a conductive element or network that can be placed in conductive communication with an electrode by attachment mechanism 26 as described with respect to fishing lure 30 above. Device 10 can then be operated as described above to embed the scent in the wetsuit or other waterborne device using the method described above.

In the above embodiment, fishing lure 30 is illustrated as a fishing hook. It should be understood, however, that fishing lure 30 can also be embodied as a fishing hook accessory that attaches to a fishing hook to attract a fish to the fishing hook.

Figure 6A:
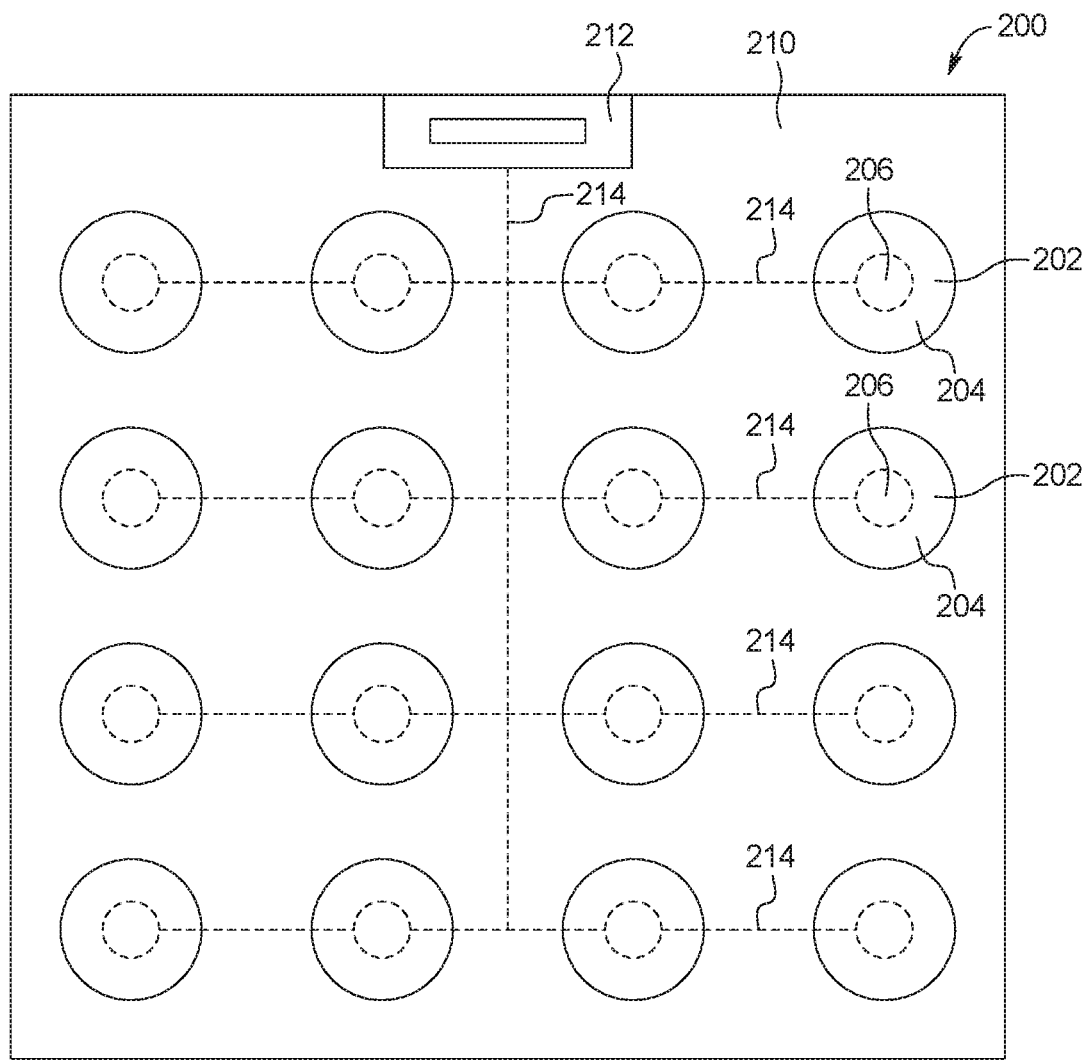
FIG. 6A is a front plan view of an example embodiment of an accessory holder according to the present disclosure.
Figure 6B:
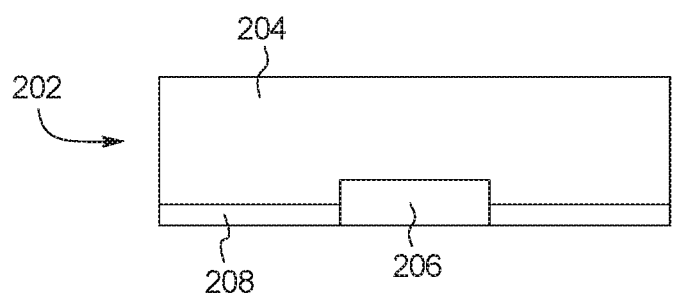
FIG. 6B is a side cross-sectional view of an individual fishing accessory held by the accessory holder of FIG. 6A.

FIG. 6A illustrates an example embodiment of an accessory holder 200 including a plurality of fishing lure accessories 202 that can attach to a fishing hook, while FIG. 6B illustrates an individual accessory 202. In the illustrated embodiment, each accessory 202 includes a body 204, a conductive material 206 and an adhesive material 208.

Figure 6C:
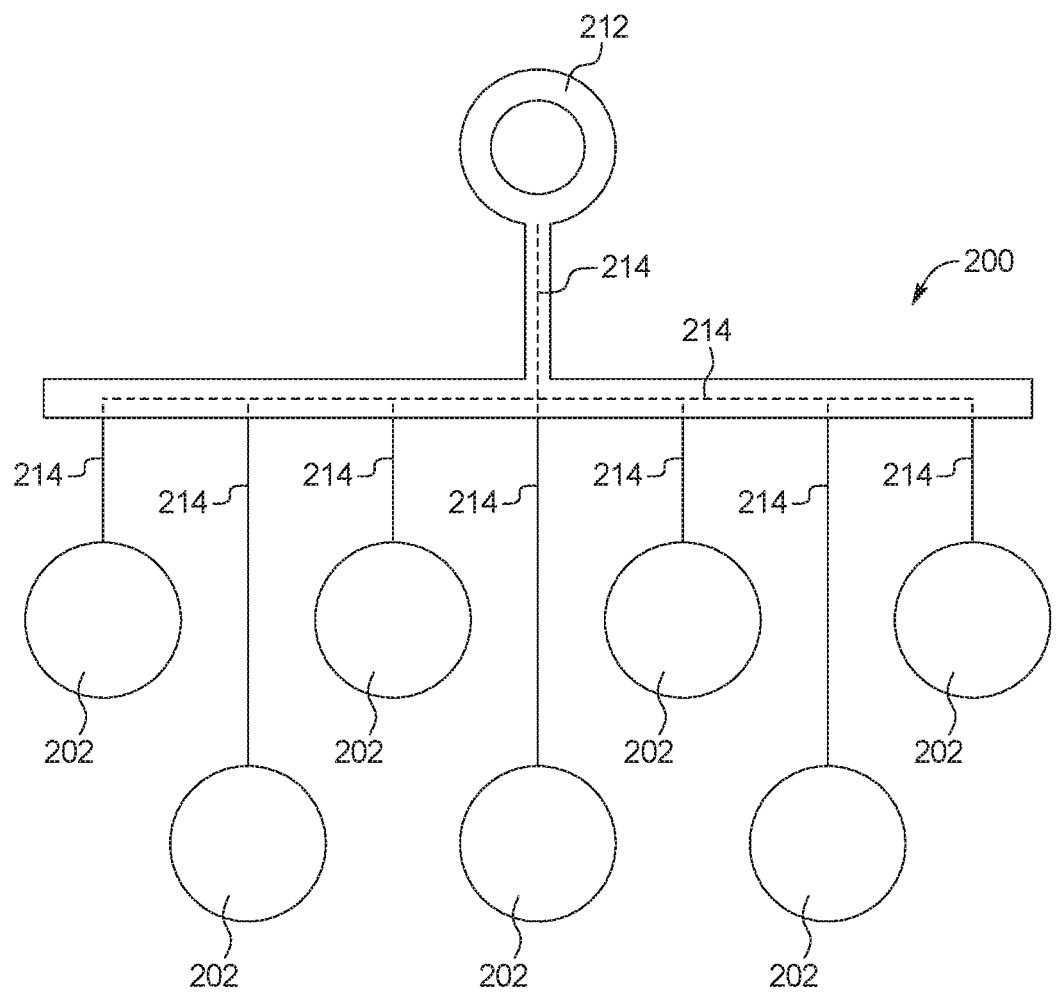
FIG. 6C is a front plan view of an example embodiment of an accessory holder according to the present disclosure.

In the illustrated embodiment, accessory holder 200 is a flat sheet that includes a face 210 to which the plurality of fishing lure accessories 202 are initially attached. Those of ordinary skill in the art will recognize other shapes and sizes that can be used for accessory holder 200. For example, accessory holder 200 could be round with the plurality of fishing lure accessories 202 encircling a central conductive portion. FIG. 6C illustrates an example embodiment of an alternative configuration of accessory holder 200.

In use, accessory holder 200 can be attached to attachment mechanism 26 via conductive attachment 212, and an electrical charge can be applied as described above to add one or more scents to the plurality of fishing lure accessories 202. In the illustrated embodiment, a conductive wire 214 is located within or on the material forming accessory holder 200 to place conductive attachment 212 in electrical communication with conductive material 206 of each accessory 202. When an electrical charge is applied to conductive attachment 208 via attachment mechanism 26 as described above, the electrical charge is transferred to each conductive material 212 of each accessory 202, thus drawing in a scent and/or applying a charge to each accessory 202 as described above.

In the illustrated embodiment, conductive material 206 is located at the bottom of accessory 202 to directly contact conductive wire 214 on accessory holder 200. In an alternative embodiment, conductive wire 210 can be removed, and accessory holder 200 itself can be partially or fully conductive to transfer the electrical charge to conductive material 206 of each accessory 202.

In an embodiment, body 204 can be formed of a porous material configured to absorb a scent with or without a charge applied to conductive material 206. For example, body 204 can be formed of a textile material configured to soak up a liquid scent. In an embodiment, body 204 can formed of pumice, an aerated plastic or a roughened surface. In the illustrated embodiment, the plurality of fishing lure accessories 202 can be manufactured without a scent attached, and then a user can customize the scent for a particular accessory holder 200 with a plurality of fishing lure accessories 202 using, for example, any of the methods discussed above for scent application device 10.

In an embodiment, conductive material 206 and/or conductive wire 214 can include, for example, a metal such as copper, silver, gold, aluminum, zinc, nickel, brass, bronze, iron, platinum, steel or lead, or an alloy or mixture thereof. In an embodiment, adhesive material 208 can include a reusable and/or waterproof adhesive, for example, a silicone-based adhesive.

In the illustrated embodiment, the accessories 202 are attached to accessory holder 200 by adhesive 208. In use, each accessory 202 can be separately peeled off of accessory holder 200 and can be adhered to a fishing hook or other fishing device designed to attract or repel fish. It is envisioned that a plurality of sheets 200 could be impregnated with different scents, and individuals could use and discard accessories 202 as they see fit. For example, an individual could attach to a fishing hook an accessory 202 from a sheet 200 charged with a first scent, and if the first scent failed to attract a fish as desired, the individual could remove from the fishing hook the first scented accessory 202 and attach an accessory 202 from an accessory holder 200 charged with a second scent. The individual could also use the plurality of accessories 202 by replacing the same or a different scented accessory as the scent fades through use.

Although the illustrated embodiment uses an adhesive 208 to attach each accessory 202 to an accessory holder 200 and to a fishing hook or other fishing device, those of ordinary skill in the art will recognize other attachment mechanisms that can be used, for example, clamps.

Figure 7A:
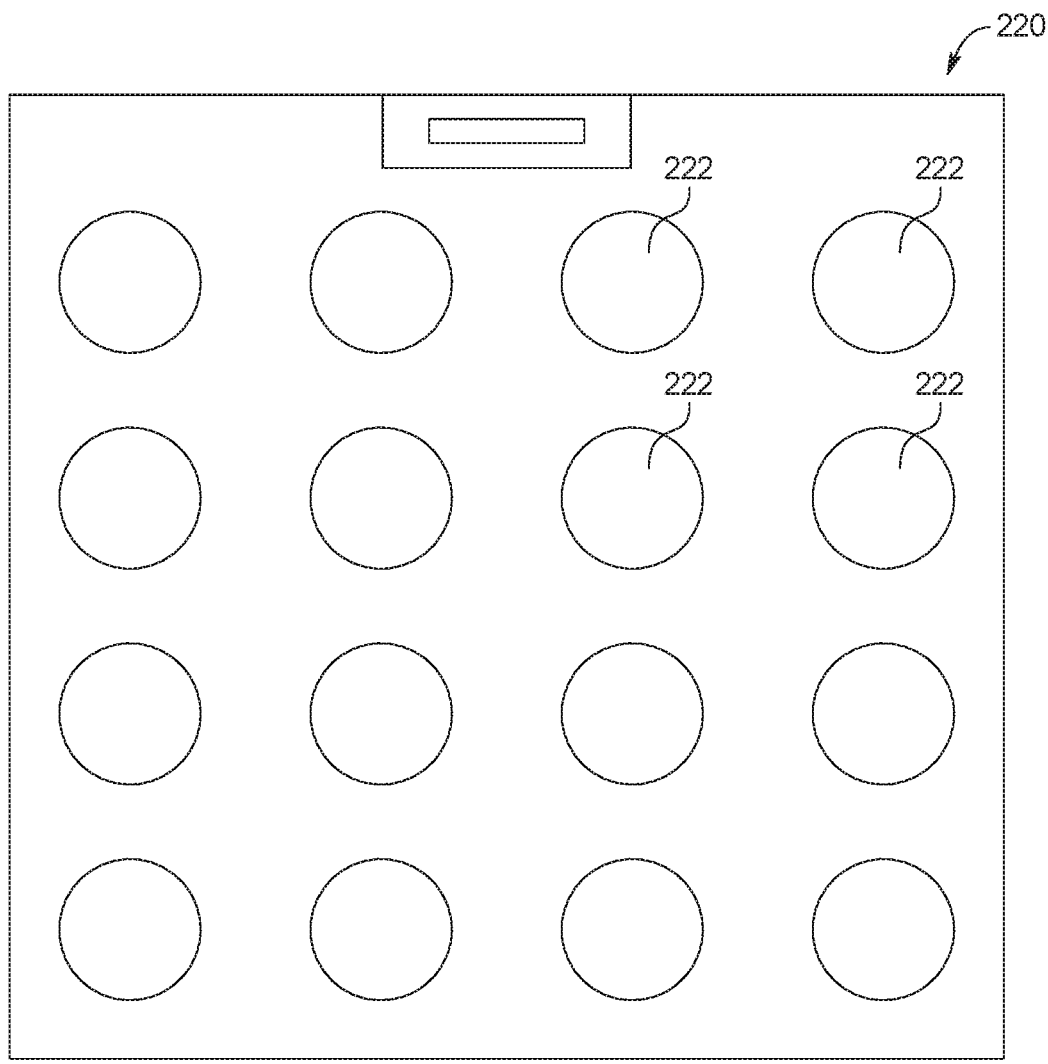
FIG. 7A is a front plan view of an example embodiment of an accessory holder according to the present disclosure.
Figure 7B:
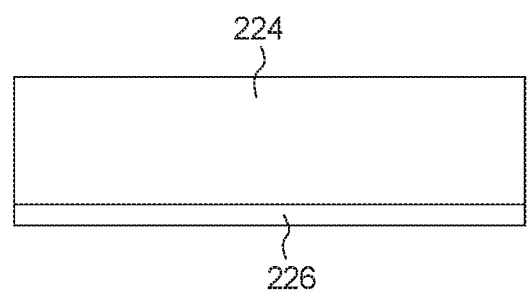
FIG. 7B is a side cross-sectional view of an individual fishing accessory held by the accessory holder of FIG. 7A.

FIG. 7A illustrates another example embodiment of an accessory holder 220 including a plurality of fishing lure accessories 222 that can attach to a fishing hook or other fishing device, while FIG. 7B illustrates an individual accessory 222. In FIGS. 7A and 7B, each individual accessory 222 does not include a conductive material. Accessory holder 220 is itself conductive, and can be attached to attachment mechanism 26 via attachment 228, and an electrical charge can be applied above. When the electrical charge is applied to accessory holder 220, a scent can be attracted to and absorbed by body 224 of each accessory 222.

In an embodiment, body 224 can be formed of a porous material configured to absorb a scent with or without a charge applied to accessory holder 220. For example, body 224 can be formed of a textile material configured to soak up a liquid scent. In an embodiment, body 224 can formed of pumice, an aerated plastic or a roughened surface. In the illustrated embodiment, the plurality of fishing lure accessories 222 can be manufactured without a scent attached, and then a user can customize the scent for a particular accessory holder 220 with a plurality of fishing lure accessories 222 using, for example, any of the methods discussed above for scent application device 10. In an embodiment, adhesive material 226 can include a reusable and/or waterproof adhesive, for example, a silicone-based adhesive.

In an alternative embodiment, accessory holder 220 and the plurality of fishing lure accessories 222 can be made without any conductive material. In this embodiment, accessory holder 220 can be dipped into container 20 to apply a scent to each accessory 222 as described above, or steam can be used as described above. The accessories 222 can then be used as described above with respect to accessories 202. In this embodiment, the plurality of fishing lure accessories 222 can be manufactured without a scent attached, and then a user can customize the scent for a particular accessory holder 220 with a plurality of fishing lure accessories 222 using, for example, non-conductive methods discussed above for scent application device 10.

FIG. 8A illustrated an alternative embodiment of an accessory 202, 222 that can be used with the accessory holders 200, 220 discussed above, while FIG. 8B illustrates accessory 202, 222 attached to a fishing hook via adhesive 208, 226. In the illustrated embodiment, accessory 202, 222 includes a plurality of strips 230 that dangle to attract fish. By adhering accessory 202, 222 to a fishing hook or other fishing device, accessory 202, 222 can be used to not only attract a fish via its applied scent, but also through the visual use of its dangling strips 230. In an embodiment, the accessories 202, 222 can be used without applying any scent thereto due to the visual attraction provided by strips 230.

In an embodiment, accessories 202, 222 can be made with different forms and designs to attract different types of fish. For example, accessories 202, 222 can be formed of different colors and shapes to look, for example, like fish or bait. Accessories 202, 222 can also be made with different textures and sizes to appeal to different types of fish. For example, accessories 202, 222 can be made in the shapes of a fish, worm crab, insect or the like.

FIG. 9A illustrates another example embodiment of an accessory 240 that could be added to a fishing hook or other fishing device, while FIG. 9B illustrates accessory 240 attached to a fishing hook. In the illustrated embodiment, accessory 240 includes a body 242 and a conductive wire 244 running through body 242. In use, conductive wire 244 can be placed in electrical communication with, for example, attachment mechanism 26 discussed above, and an electrical charge can be applied to conductive wire 244 to attach a scent to body 242. In the illustrated embodiment, body 242 also includes an aperture 246 therethrough to enable accessory 240 to be attached to a fishing lure by placing a fishing line through aperture, as illustrated in FIG. 9B.

In an embodiment, body 242 can be formed of a porous material configured to absorb a scent with or without a charge applied to conductive wire 244. For example, body 242 can be formed of a textile material configured to soak up a liquid scent. In an embodiment, body 242 can formed of pumice, an aerated plastic or a roughened surface. In an embodiment, conductive wire 244 can include, for example, a metal such as copper, silver, gold, aluminum, zinc, nickel, brass, bronze, iron, platinum, steel or lead, or an alloy or mixture thereof.

FIG. 10 illustrates an example embodiment of a fishing hook 250 that can be used with the present disclosure. In the illustrated embodiment, fishing hook 250 includes a body 252 and a conductive wire 254 running through body 252. In use, conductive wire 252 can be placed in electrical communication with, for example, attachment mechanism 26 discussed above, and an electrical charge can be applied to conductive wire 254 to attach a scent to body 252. In an embodiment, conductive wire 254 can include, for example, a metal such as copper, silver, gold, aluminum, zinc, nickel, brass, bronze, iron, platinum, steel or lead, or an alloy or mixture thereof.

FIG. 11 illustrates an example embodiment of a fishing line 260 that can be used in accordance with the present disclosure. In the illustrated embodiment, fishing line 260 includes a body 262 and a conductive wire 264 running through body 262. In use, conductive wire 262 can be placed in electrical communication with, for example, attachment mechanism 26 discussed above, and an electrical charge can be applied to conductive wire 264 to attach a scent to body 262. In an embodiment, conductive wire 264 can include, for example, a metal such as copper, silver, gold, aluminum, zinc, nickel, brass, bronze, iron, platinum, steel or lead, or an alloy or mixture thereof.

Figure 12A:
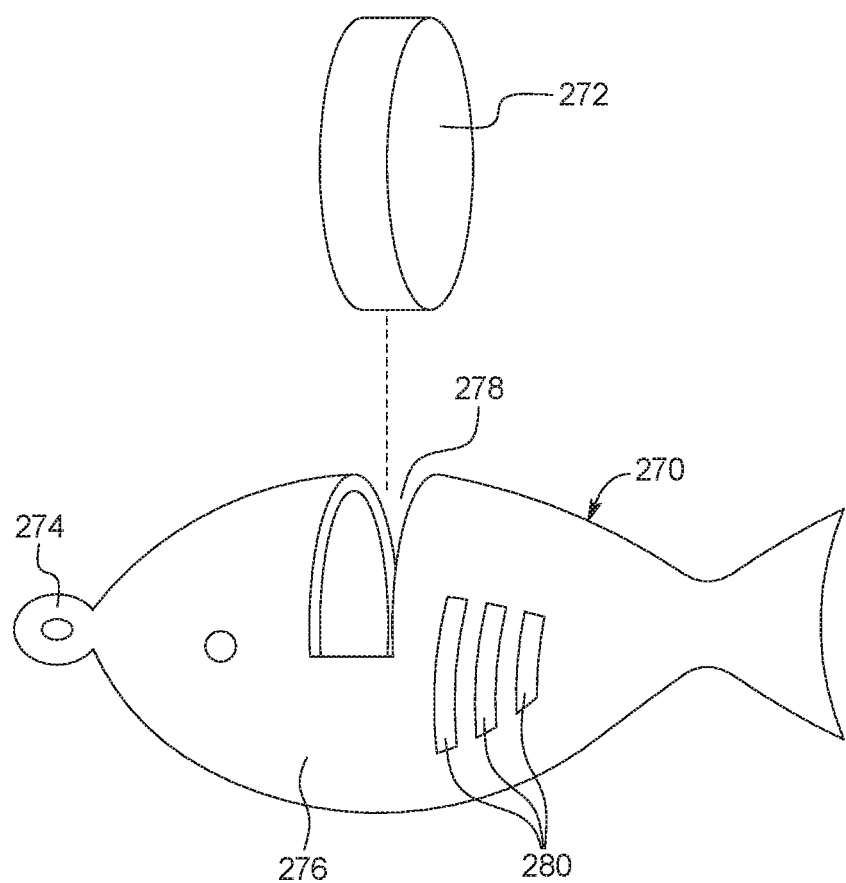
FIG. 12A is a front perspective view of an example embodiment of a fishing lure and fishing lure accessory according to the present disclosure.
Figure 12B:
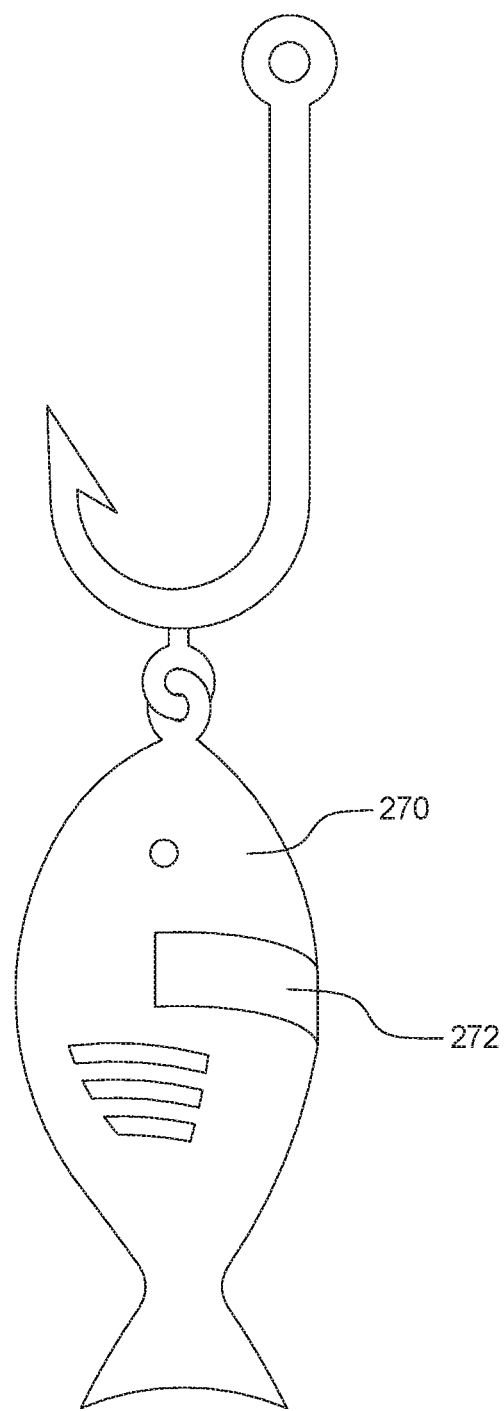
FIG. 12B is a front plan view showing the fishing lure of FIG. 12A attached to a fishing hook.

FIG. 12A illustrates another example embodiment of a fishing lure 270 and fishing lure accessory 272 that can be used in accordance with the present disclosure. In the illustrated embodiment, fishing lure 270 includes a connection 274 enabling fishing lure 270 to be attached to a fishing hook as shown in FIG. 12B, although those of ordinary skill in the art will recognize that fishing lure 270 can itself be formed as the fishing hook.

In the illustrated embodiment, fishing lure 270 is formed to look like bait for a fish. Those of ordinary skill will recognize that FIG. 12A is exemplary, and that other shapes, sizes and colors can be used to attract different types of fish.

In the illustrated embodiment, fishing lure 270 includes a body 276 including a slot 278. In use, fishing lure accessory 272 is scented and is placed into slot 278 to provide the scent to fishing lure 270 that is intended to attract fish. In the illustrated embodiment, fishing lure accessory 272 is a disc shape that snap-fits into slot 278, although those of ordinary skill in the art will recognize that other shapes and attachments can be used to achieve the same goals.

Fishing lure 270 and fishing lure accessory 272 as advantageous, for example, because a plurality of individual fishing lure accessories 272 can be interchangeably used with fishing lure 270 as desired. For example, a first fishing lure accessory 272 can be placed into slot 278 and used with fishing lure 270 until the scent of the first fishing lure accessory 272 fades or the user desires to use a different scent. At that point, the user can remove first fishing lure accessory 272 and insert a second fishing lure accessory 272 having a different scent or an unused fishing lure accessory 272 having the same scent. In this way, the user can customize the scent of fishing lure 270 with ease and ensure that the scent remains strong over time.

Figure 12C:
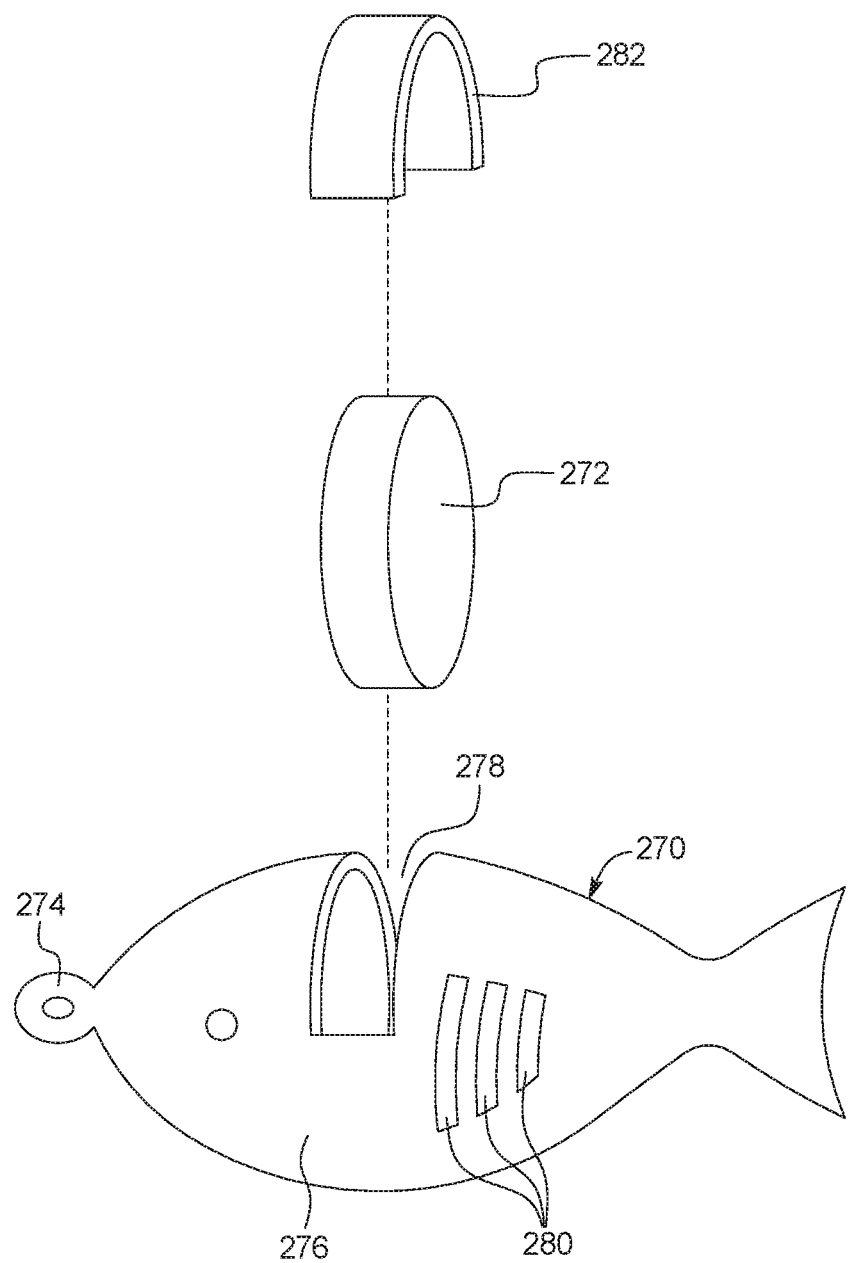
FIG. 12C is a front perspective view of another example embodiment of a fishing lure and fishing lure accessory according to the present disclosure.

In the illustrated embodiment, body 276 can be hollow inside and include vents 280 that enable the scent from lure accessory 272 to disperse outside of the body. In an embodiment, body 26 can formed of a porous plastic. FIG. 12C illustrates an embodiment in which lure accessory 272 can enclosed within body 276 by a cap 282, such that vents 280 are the only way for the scent to disperse from fishing lure accessory 272. In an embodiment, cap 282 can snap-fit onto body 276, can be pivotally attached to body 276, can attach to body 276 via a magnetic force, a spring clip or an adhesive, or can attach to body 276 by other attachment mechanisms known in the art. Alternatively, fishing lure 270 can be used as shown in FIG. 12B, wherein part of lure accessory 272 is exposed outside of body 276 to disperse the scent of lure accessory 272.

In an embodiment, accessory 272 can include a magnet. The magnet can be used, for example, to attach accessory 272 to fishing lure 270, which can also include a magnet. In an embodiment, accessory 272 can be made magnetic via device 10 as described above.

In an embodiment, accessory 272 can include electronics to give off an electrical impulse. Certain fish may be attracted to an electrical impulse, and accessory 272 could make fishing lure 270 more attractive to fish by including this feature. In an embodiment, an accessory 272 with an electrical impulse could be used with fishing lure 270 until the electrical impulse runs out or weakens, and then a new accessory 272 could be added to fishing lure 270 to refresh the electrical impulse. In another embodiment, an accessories 272 with an electrical impulse could be interchanged with non-impulse accessories 272 as desired by a user.

Figure 12D:
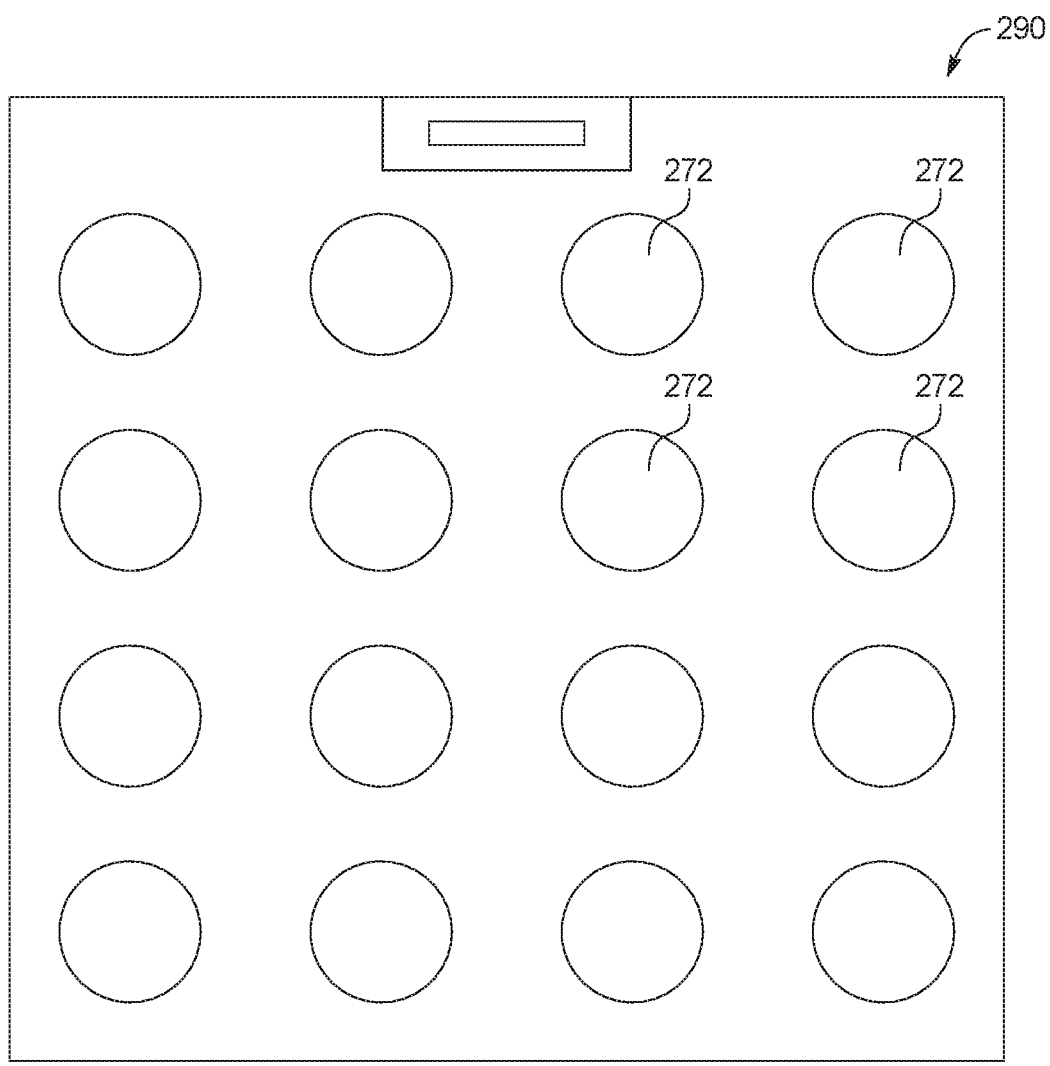
FIG. 12D is a front plan view of an example embodiment of an accessory holder holding a plurality of the fishing lure accessories shown in FIGS. 12A to 12C.

FIG. 12D illustrates an example embodiment of an accessory holder 290 including a plurality of fishing lure accessories 272 that can be used with fishing lure 270. In the illustrated embodiment, all or a portion of accessory holder 290 can be made with a conductive material, and/or fishing lure accessories 272 themselves can be formed in part or whole with a conductive material as described above, such that a scent can be applied to fishing lure accessories 272 by applying a charge to accessory holder 290 and/or fishing lure accessories 272 by attaching accessory holder 290 to attachment mechanism 26 and applying an electrical charge as described above. Alternatively, accessory holder 290 and/or fishing lure accessories 272 can be made without a conductive material and dipped or steamed with a scent as described above without applying an electrical charge.

It is envisioned that fishing lure accessories 272 could be impregnated with different scents, and individuals could use and discard accessories 272 as they see fit. For example, an individual could attach to a fishing lure 270 an accessory 272 having a first scent, and if the first scent failed to attract a fish as desired, the individual could remove from the fishing hook the first scented accessory 272 and attach an accessory 272 having a second scent. The individual could also use the plurality of accessories 272 by replacing the same or a different scented accessory as the scent fades through use.

In an embodiment, fishing lure accessory 272 can be formed of a porous material configured to absorb a scent with or without a charge applied to conductive wire 244. For example, fishing lure accessory 272 can be formed of a textile material configured to soak up a liquid scent. In an embodiment, fishing lure accessory 272 can formed of pumice, an aerated plastic or a roughened surface. In an embodiment, fishing lure accessory 272 can include, for example, a metal such as copper, silver, gold, aluminum, zinc, nickel, brass, bronze, iron, platinum, steel or lead, or an alloy or mixture thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A fishing lure configured to be customized with different scents, the fishing lure comprising:
   a body; and
   a plurality of attachments configured to be attached to and detached from the body, wherein a first attachment of the plurality of attachments includes a first scent, and a second attachment of the plurality of attachments includes a second scent, wherein the first attachment and the second attachment can be interchangeably attached to and detached from the body at a same location of the body, and wherein the first and second attachments each include an electrically conductive material for application of an electric or magnetic charge, thereby allowing the attachments to (i) cure a liquid scent forming the first or second scent or (ii) attract an ionized scent forming the first or second scent.

2. The fishing lure of claim 1, wherein the body includes a hook.

3. The fishing lure of claim 1, wherein the body is configured to be attached to a hook.

4. The fishing lure of claim 1, wherein the body includes a slot configured to interchangeably receive the first and second attachments.

5. The fishing lure of claim 4, wherein the first attachment and the second attachment are disc-shaped and interchangeably fit into the slot.

6. The fishing lure of claim 1, wherein the first attachment and the second attachment are reusable.

7. The fishing lure of claim 1, wherein the body includes vents to disperse the first scent when the first attachment is attached to the body and the second scent when the second attachment is attached to the body.

8. The fishing lure of claim 6, wherein at least one of the plurality of reusable attachments includes a porous material for absorbing the first or second scent.

9. The fishing lure of claim 6, wherein at least one of the plurality of reusable attachments includes at least one of a textile material, a pumice, an aerated plastic or a roughened surface.

10. The fishing lure of claim 6, wherein at least one of the plurality of reusable attachments is manufactured without a scent, wherein the first or second scent is user applied.

* * * * *